United States Patent
Yang et al.

(10) Patent No.: US 11,186,726 B2
(45) Date of Patent: Nov. 30, 2021

(54) AQUEOUS POLYMER DISPERSION AND AQUEOUS COATING COMPOSITION COMPRISING THE SAME

(71) Applicants: Dow Global Technologies LLC, Midland, MI (US); Rohm and Haas Company, Collegeville, PA (US)

(72) Inventors: Weijun Yang, Shanghai (CN); Hu Li, Shanghai (CN); Siyuan Jiang, Shanghai (CN); Tao Wang, Shanghai (CN); Alvin M. Maurice, Lansdale, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 108 days.

(21) Appl. No.: 16/490,081

(22) PCT Filed: Apr. 1, 2017

(86) PCT No.: PCT/CN2017/079238
§ 371 (c)(1),
(2) Date: Aug. 30, 2019

(87) PCT Pub. No.: WO2018/176443
PCT Pub. Date: Oct. 4, 2018

(65) Prior Publication Data
US 2020/0048474 A1    Feb. 13, 2020

(51) Int. Cl.
| | | |
|---|---|---|
| *C09D 5/02* | (2006.01) | |
| *C08L 33/08* | (2006.01) | |
| *C09D 7/65* | (2018.01) | |
| *C09D 7/63* | (2018.01) | |

(52) U.S. Cl.
CPC .............. *C09D 5/027* (2013.01); *C08L 33/08* (2013.01); *C09D 7/63* (2018.01); *C09D 7/65* (2018.01); *C08L 2201/50* (2013.01)

(58) Field of Classification Search
CPC .................................. C08L 25/16; C08L 35/06
See application file for complete search history.

(56) References Cited

U.S. PATENT DOCUMENTS

| | | |
|---|---|---|
| 5,389,699 A | 2/1995 | Rehmer et al. |
| 5,439,970 A | 8/1995 | Reeb |
| 8,420,709 B2 | 4/2013 | Breiner et al. |
| 8,536,217 B2 | 9/2013 | Loccufier et al. |
| 2006/0058445 A1* | 3/2006 | Leuninger ............ C08F 265/00 524/500 |
| 2006/0105261 A1 | 5/2006 | Keoshkerian et al. |
| 2007/0055032 A1 | 3/2007 | Langenbuch et al. |

FOREIGN PATENT DOCUMENTS

| | | |
|---|---|---|
| EP | 0778296 A1 | 6/1997 |
| EP | 0915108 B1 | 5/2003 |
| EP | 2077301 A2 | 7/2009 |
| WO | 2012145857 A1 | 11/2012 |

* cited by examiner

*Primary Examiner* — Wenwen Cai
(74) *Attorney, Agent, or Firm* — Karl E. Stauss; Cantor Colburn LLP

(57) ABSTRACT

An aqueous polymer dispersion is composed of (i) an emulsion polymer having a weight average molecular weight of from 2,000 to 30,000 daltons, wherein the emulsion polymer comprises as polymerized units, based on the dry weight of the emulsion polymer, (a) from 10% to 90% by weight of an ethylenically unsaturated ionic monomer, (b) from 5% to 90% by weight of a photosensitive monomer, and (c) from 0 to 85% by weight of an ethylenically unsaturated nonionic monomer; and (ii) from 3.5% to 50% by weight of TEMPO and/or a derivative thereof, based on the total dry weight of the aqueous polymer dispersion. An aqueous coating composition comprising the aqueous polymer dispersion and a binder provides coatings with improved durability.

9 Claims, No Drawings

AQUEOUS POLYMER DISPERSION AND AQUEOUS COATING COMPOSITION COMPRISING THE SAME

FIELD OF THE INVENTION

The present invention relates to an aqueous polymer dispersion and an aqueous coating composition comprising the same.

INTRODUCTION

In exterior coating applications, durability is a key property to enable coatings to maintain color and gloss upon exposure to the elements such as sunlight. Inorganic pigments such as $TiO_2$, commonly used additives for paints, when exposed to sunlight, may adversely affect coating durability.

Incorporation of photo-stabilizers such as ultraviolet (UV) absorbers, UV stabilizers, or photo-antioxidants into coatings is one of commonly used approaches to improve durability in the coating industry. UV absorbers are broadly used due to their excellent photo-stabilization efficiency. They protect coatings against photo-induced damages by absorbing the harmful actinic solar radiation and transforming the absorbed radiation energy into less harmful thermal energy via a photophysical process involving ground state and excited state molecules. The most widely used UV absorbers in coatings include derivatives of 2-hydroxybenzophenones (BP), benzotriazoles (BT), triazines (TA), and oxanilides (OA). Photo-antioxidants such as hindered amines can prolong the lifetime of coatings by scavenging of chain propagating alkylperoxyls and deactivating of hydroperoxides. These photo-stabilizers and photo-antioxidants are usually post added into paints after being dissolved in organic solvents, which contribute VOCs.

EP0778296A1 discloses an aqueous emulsion polymer comprising, as polymerized units, (a) from 50 to 99.8 percent by weight of at least one alkyl(meth)acrylate, (b) from 0.2 to 20 percent by weight of a compound of formula (i), such as methylstyrene; (c) from 0 to 10 percent by weight of at least one ct, P3-ethylenically unsaturated monobasic or dibasic carboxylic acids or their anhydrides, and (d) from 0 to 49.8 percent by weight of at least one alpha-beta unsaturated monomer different from (a), (b), and (c), wherein the Tg of the emulsion polymer is less than 0° C. The paints thus produced have dirt prick up properties, while durability properties remain insufficient. Therefore, it is desirable to provide an aqueous polymer dispersion suitable for coating applications that provides coatings with improved durability.

SUMMARY OF THE INVENTION

The present invention provides an aqueous polymer dispersion comprising a novel combination of 2,2,6,6-tetramethyl-1-piperidinyloxy (TEMPO) and/or derivatives thereof with a specific emulsion polymer that comprises polymerized units of at least one photosensitive monomer. Such aqueous polymer dispersion is particularly useful in coating applications. The aqueous polymer dispersion of the present invention provides coatings with better durability indicated by higher 60° gloss retention after 1650 hour QUV test, as compared to incumbent aqueous polymer dispersions that do not comprise the specific emulsion polymer, TEMPO, or a derivative of TEMPO.

In a first aspect, the present invention is an aqueous polymer dispersion comprising:

(i) an emulsion polymer having a weight average molecular weight of from 2,000 to 30,000 daltons, wherein the emulsion polymer comprises as polymerized units, based on the dry weight of the emulsion polymer, (a) from 10% to 90% by weight of an ethylenically unsaturated ionic monomer, (b) from 5% to 90% by weight of a photosensitive monomer, and (c) from 0 to 85% by weight of an ethylenically unsaturated nonionic monomer; and (ii) from 3.5% to 50% by weight of TEMPO and/or a derivative thereof, based on the total dry weight of the aqueous polymer dispersion.

In a second aspect, the present invention is a process of preparing the aqueous polymer dispersion of the first aspect. The process comprises:

(I) preparing an emulsion polymer in an aqueous medium by polymerization of monomers in the presence of a surfactant and a chain transfer agent, wherein the monomers comprise, based on the total weight of the monomers, (a) from 10% to 70% by weight of an ethylenically unsaturated ionic monomer, (b) from 5% to 90% by weight of a photosensitive monomer, and (c) from 0% to 85% by weight of an ethylenically unsaturated nonionic monomer; and (II) mixing the emulsion polymer obtained from step (I) and from 3.5% to 50% by weight of TEMPO and/or a derivative thereof, based on the total dry weight of the aqueous polymer dispersion, to obtain the aqueous polymer dispersion.

In a third aspect, the present invention is an aqueous coating composition comprising the aqueous polymer dispersion of the first aspect.

DETAILED DESCRIPTION OF THE INVENTION

The term "acrylic" as used herein includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Molecular weight" as used herein refers to the weight average molecular weight as measured by Gel Permeation Chromatography (GPC) with polystyrene standards.

The term "alkyl" as used herein refers to a saturated monovalent hydrocarbon group and includes linear and branched groups with hydrogen unsubstituted or substituted by a halogen, a hydroxyl, a cyano, a sulfo, a nitro, an alkyl, a perfluoroalkyl, or combinations thereof.

The term "alkoxy" as used herein refers to an alkyl group singular bonded with oxygen. Alkoxy such as $C_1$-$C_{24}$ alkoxy is a straight-chain or branched radical, for example, methoxy, ethoxy, isopropoxy, n-butoxy, sec-butoxy, tert-butoxy, heptyloxy, octyloxy, isooctyloxy, nonyloxy, decyloxy, undecyloxy, dodecyloxy, tetradecyloxy, hexadecyloxy, and octadecyloxy.

The term "hetero(aryl)" as used herein refers to an aryl or a heteroaryl. The term "aryl" as used herein is defined as an aromatic or polyaromatic substituent containing at least one aromatic ring (each ring containing 6 conjugated carbon atoms and no heteroatoms) that are optionally fused to each other or bonded to each other by carbon-carbon single bonds. A substituted aromatic or aryl group refers to an aryl ring with one or more substituents replacing the hydrogen atoms on the ring. The aryl group is unsubstituted or optionally and independently substituted by any synthetically accessible and chemically stable combination of substituents that are independently a halogen, a cyano, a sulfo, a carboxy, an alkyl, a perfluoroalkyl, an alkoxy, an alkylthio, an amino, a monoalkylamino, or a dialkylamino. Examples include substituted or unsubstituted derivatives of phenyl; biphenyl; o-, m-, or p-terphenyl; 1-naphthal; 2-naphthal; 1-, 2-, or 9-anthryl; 1-, 2-, 3-, 4-, or 9-phenanthrenyl and 1-, 2-, or 4-pyrenyl. Preferable aromatic or aryl groups are phenyl, substituted phenyl, naphthyl or substituted naphthyl. The term "heteroaryl" as used herein is defined as substituent having the characteristics of an aromatic compound whilst having at least one non-carbon atom in the ring.

The term "heterocyclyl" as used herein refers to rings having one or more atoms other than carbon in at least one of its rings.

The aqueous polymer dispersion of the present invention comprises one or more emulsion polymers (i). The emulsion polymer useful in the present invention may comprise, as polymerized units, one or more ethylenically unsaturated ionic monomers. The term "ionic monomers" herein refers to monomers that bear an ionic charge between pH=1-14. The ethylenically unsaturated ionic monomers may include a, (3-ethylenically unsaturated carboxylic acids and/or their anhydrides, for example, (meth)acrylic anhydride, maleic anhydride, or mixtures thereof; sulfonate monomers such as sodium styrene sulfonate (SSS) and sodium vinyl sulfonate (SVS); acrylamido-2-methylpropanesulfonic acid (AMPS), and carbonate monomers; or mixtures thereof. Preferred ethylenically unsaturated ionic monomers are selected from the group consisting of acrylic acid, methyl acrylic acid, crotonic acid, acyloxypropionic acid, maleic acid, fumaric acid, and itaconic acid. The emulsion polymer may comprise as polymerized units, based on the dry weight of the emulsion polymer, 10% by weight or more, 20% by weight or more, 25% by weight or more, 30% by weight or more, or even 35% by weight or more, and at the same time, 90% by weight or less, 85% by weight or less, 70% by weight or less, 65% by weight or less, 60% by weight or less, or even 50% by weight or less, of the ethylenically unsaturated ionic monomer.

The emulsion polymer useful in the present invention may comprise as polymerized units, one or more photosensitive monomers. Photosensitive monomers refer to monomers that are sensitive to solar radiation and can absorb ultraviolet or visible region of electromagnetic radiation. In some embodiments, the photosensitive monomer useful in the present invention comprises one or more substituted styrene having the structure of formula (I),

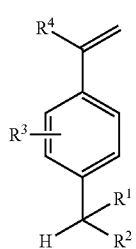

(I)

wherein $R^1$, $R^2$, and $R^3$ are each independently selected from the group consisting of hydrogen (H), an alkyl, an alkoxy, and a (hetero)aryl; and $R^4$ is H or an alkyl.

$R^1$, $R^2$, $R^3$ and $R^4$ in formula (I) each independently can be a $C_1$-$C_{26}$ alkyl, a $C_1$-$C_{10}$ alkyl, or a $C_1$-$C_6$ alkyl; and preferably methyl, ethyl, hexyl, or combinations thereof.

$R^1$, $R^2$, and $R^3$ in formula (I) each independently can also be a $C_1$-$C_{26}$ alkoxy, a $C_1$-$C_{10}$ alkoxy, or a $C_1$-$C_6$ alkoxy; and preferably, methoxy, ethoxy, butoxy, or combinations thereof.

$R^1$, $R^2$, and $R^3$ in formula (I) can be each independently a $C_5$-$C_{16}$ (hetero)aryl, a $C_5$-$C_{10}$ (hetero)aryl, or a $C_5$-$C_6$ (hetero)aryl; and preferably phenyl, naphthalenyl, pyridinyl, thiophenyl, furanyl, or combinations thereof. Preferably, $R^1$, $R^2$, and $R^3$ are each independently selected from H, methyl, ethyl, hexyl, or combinations thereof.

Preferred $R_4$ in formula (I) is hydrogen or methyl.

Specific examples of substituted styrene include vinyl toluene, 1-ethyl-4-vinylbenzene, 1-propyl-4-vinylbenzene, 1-methyl-4-(prop-1-en-2-yl)benzene, 2, 4-dimethyl-1-vinylbenzene, 1, 2-dimethyl-4-vinylbenzene, or mixtures thereof. Preferred substituted styrene is vinyl toluene, 1-methyl-4-(prop-1-en-2-yl)benzene, 4-dimethyl-1-vinylbenzene, 1, 2-dimethyl-4-vinylbenzene, or a mixture thereof.

In some further embodiments, the photosensitive monomer useful in the present invention comprises one or more benzophenone derivatives. The benzophenone derivatives may have the structure of formula (II), (III) or (IV). In one embodiment, the benzophenone derivative has the structure of formula (II),

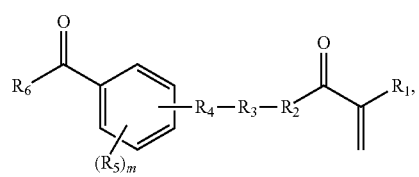

(II)

wherein $R_1$ is H or methyl,
wherein $R_2$ is —O— or —NH—,
wherein $R_3$ has the following structure Z,

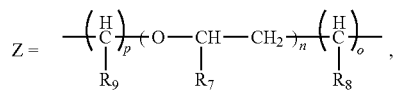

wherein $R_7$, $R_8$, $R_9$ are each independently H or methyl, and preferably H; n is an integer of from 0 to 200, from 0 to 50, from 0 to 30, or from 0 to 2; and o and p are each independently an integer of from 0 to 2, and preferably 0 or 1;

wherein $R_4$ is —O—, —NH—, —O—CO—O—, —CO—, —NH—CO—O—, —NH—CO—NH—, or —S—, preferably —CO—O—, —O— or —NH—;

wherein $R_5$ is H, a halogen, or a $C_1$-$C_{20}$ moiety optionally substituted by oxygen, nitrogen, sulphur, or combinations thereof; and preferably, $R_5$ is H or a halogen;

wherein m is an integer of from 1 to 4, from 1 to 3, or from 1 to 2; and wherein $R_6$ is an alkyl, an aryl, or a heterocyclyl; and preferably, $R_6$ is an aryl or an alkyl.

In one embodiment, the benzophenone derivative useful in the present invention has the structure of formula (III) or (IV),

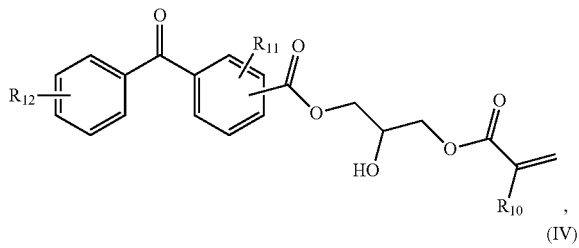

(III)

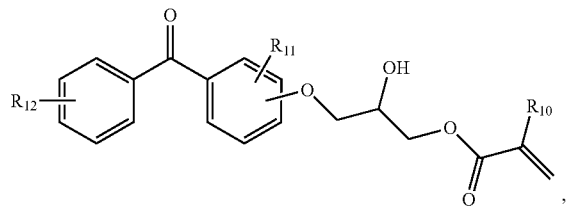

(IV)

wherein $R_{10}$ is H or methyl, preferably methyl; and $R_{11}$ and $R_{12}$ are each independently selected from H; an alkyl including, for example, a $C_1$-$C_{26}$ alkyl, a $C_1$-$C_{10}$ alkyl, or a $C_1$-$C_6$ alkyl, and preferably methyl, ethyl, hexyl, or combinations thereof; an alkoxy including, for example, a $C_1$-$C_{26}$ alkoxy, a $C_1$-$C_{10}$ alkoxy, or a $C_1$-$C_6$ alkoxy, and preferably methoxy, ethoxy, butoxy, or combinations thereof; an (hetero)aryl including, for example, a $C_5$-$C_{16}$ (hetero)aryl, a $C_5$-$C_{10}$ (hetero)aryl, or a $C_5$-$C_6$ (hetero)aryl, or combinations thereof, and preferably phenyl, naphthalenyl, pyridinyl, thiophenyl, furanyl, or combinations thereof.

Suitable benzophenone derivatives may include, for example, 2-hydroxy-3-(methacryloyloxy)propyl 2-benzoylbenzoate, 3-(2-benzoylphenoxy)-2-hydroxypropyl methacrylate, (2-hydroxy-3-acryloxy)propoxy para-benzoylbenzene, 3-(2-benzoylphenoxy)-2-hydroxypropyl acrylate, or mixtures thereof. Preferred benzophenone derivative has the structure of formula (V):

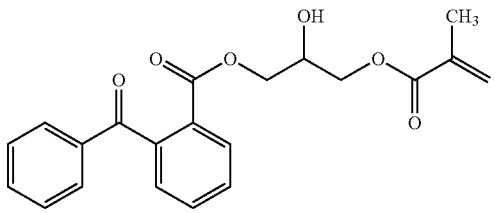

(V)

The photosensitive monomers useful in the present invention may comprise two or more different substituted styrenes having the structure of formula (I); two or more different benzophenone derivatives having the structure of formula (II), (III) or (IV); or a mixture of the substituted styrene and the benzophenone derivative. In some embodiments, the photosensitive monomer comprises at least one of the substituted styrenes and at least one of the benzophenone derivatives. Preferably, the photosensitive monomer is a mixture of vinyl toluene and the benzophenone derivative.

The emulsion polymer useful in the present invention may comprise as polymerized units, based on the dry weight of the emulsion polymer, 5% by weight or more, 10% by weight or more, 15% by weight or more, or even 20% by weight or more, and at the same time, 90% by weight or less, 80% by weight or less, 70% by weight or less, 60% by weight or less, 50% by weight or less, or even 40% by weight or less, of total photosensitive monomers.

In some embodiments, the photosensitive monomers comprise a mixture of the substituted styrene and the benzophenone derivative. In such case, the emulsion polymer may comprise as polymerized units, based on the dry weight of the emulsion polymer, (b1) the substituted styrene (e.g., vinyl toluene) in an amount of 5% by weight or more, 8% by weight or more, 10% by weight or more, and at the same time, 50% by weight or less, 40% by weight or less, 30% by weight or less, or even 20% by weight or less; and (b2) the benzophenone derivative in an amount of 5% by weight or more, 8% by weight or more, or even 10% by weight or more, and at the same time, 40% by weight or less, 35% by weight or less, 30% by weight or less, 25% by weight or less, or even 20% by weight or less.

The emulsion polymer useful in the present invention may further comprise, as polymerized units, one or more ethylenically unsaturated nonionic monomers. The term "nonionic monomers" herein refers to monomers that do not bear an ionic charge between pH=1-14. Suitable examples of the ethylenically unsaturated nonionic monomers include, for example, monoethylenically unsaturated nonionic monomers including alkyl esters of (meth)acrylic acids such as methyl acrylate, ethyl acrylate, butyl acrylate, 2-ethylhexyl acrylate, decyl acrylate, lauryl acrylate, methyl methacrylate, butyl methacrylate, butyl acrylate, isodecyl methacrylate, lauryl methacrylate, hydroxy-functional (meth)acrylic acid alkyl ester such as hydroxyethyl methacrylate, hydroxypropyl methacrylate, or mixtures thereof; (meth)acrylonitrile; (meth)acrylamide; amino-functional and ureido-functional monomers such as hydroxyethyl ethylene urea methacrylate; monomers bearing acetoacetate-functional groups such as acetoacetoxyethyl methacrylate (AAEM); cycloalkyl (meth)acrylates such as cyclohexyl (meth)acrylate, methcyclohexyl acrylate, isobornyl methacrylate, isobornyl acrylate, and dihydrodicyclopentadienyl acrylate; butadiene; ethylene, propylene, α-olefins such as 1-decene; styrene; vinyl acetate, vinyl butyrate, vinyl versatate or other vinyl esters; or combinations thereof. Preferably, the ethylenically unsaturated nonionic monomers are selected from the group consisting of methyl methacrylate, ethyl acrylate, butyl methacrylate, butyl acrylate, 2-ethylhexyl acrylate, and styrene. The emulsion polymer may comprise as polymerized units, based on the dry weight of the emulsion polymer, 0 or more, 5% by weight or more, 15% by weight or more, 20% by weight or more, 40% by weight or more, or even 50% by weight or more, and at the same time, 85% by weight or less, 75% by weight or less, 70% by weight or less, 65% by weight or less, or even 60% by weight or less, of the ethylenically unsaturated nonionic monomer.

In some embodiments, the emulsion polymer useful in the present invention comprises as polymerized units, based on the dry weight of the emulsion polymer, from 20% to 70% by weight of the ethylenically unsaturated ionic monomer, from 10% to 50% by weight of vinyl toluene, from 5% to 30% by weight of the benzophenone derivative, and from 15% to 65% by weight of the ethylenically unsaturated nonionic monomer.

The emulsion polymer useful in the present invention may have an average particle size of from 50 nanometers (nm) to 500 nm, from 70 nm to 400 nm, from 80 nm to 300 nm, or from 100 nm to 200 nm. Particle size herein refers to a volume average particle size measured by a Brookhaven BI-90 or 90Plus Particle Sizer.

The emulsion polymer useful in the present invention may be prepared by emulsion polymerization of the monomers described. Monomers for preparing the emulsion polymer are those monomers described above that are used for constituting polymerized units of the emulsion polymer, respectively. Total weight concentration of monomers for preparing the emulsion polymer is equal to 100%. The weight content of each monomer based on the total weight of monomers for preparing the emulsion polymer may be substantially the same as the weight content of such monomer as polymerized units of the emulsion polymer based on the dry weight of the emulsion polymer. A mixture of monomers may be added neat or as an emulsion in water; or added in one or more additions or continuously, linearly or nonlinearly, over the reaction period of preparing the emulsion polymer. Temperature suitable for emulsion polymerization processes may be lower than 100° C., in the range of from 30 to 98° C., or in the range of from 50 to 95° C. Multistage free-radical polymerization using the monomers described above can be used, which at least two stages are formed sequentially, and usually results in the formation of the multistage polymer comprising at least two polymer compositions.

In the polymerization process of preparing the emulsion polymer, a surfactant may be used. Examples of suitable chain transfer agents in preparing the emulsion polymer include n-dodecylmercaptan (nDDM), and 3-mercaptopropionic acid, methyl 3-mercaptopropionate (MMP), butyl 3-mercaptopropionate (BMP), benzenethiol, azelaic alkyl mercaptan, or mixtures thereof. The chain transfer agent may be used in an effective amount to control the molecular weight of the emulsion polymer. Preferably, the chain transfer agent is used in an amount from 0.001% by weight or more, 0.01% by weight or more, or even 0.1% by weight or more, and at the same time, 20% by weight or less, 15% by weight or less, or even 10% by weight or less, based on the total weight of monomers used for preparing the emulsion polymer.

In the polymerization process of preparing the emulsion polymer, a surfactant may be used. The surfactant may be added prior to or during the polymerization of the monomers, or combinations thereof. A portion of the surfactant can also be added after the polymerization.

These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. In some preferred embodiments, the alkali metal or ammonium salts of alkyl, aryl, or alkylaryl sulfates surfactant are used. The surfactant used is usually from 0.1% to 10% by weight, preferably from 0.2% to 3% by weight, based on the weight of total monomers used for preparing the emulsion polymer.

In the polymerization process of preparing the emulsion polymer, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.1 to 10% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In addition to the emulsion polymer described above, the aqueous polymer dispersion of the present invention may also comprise 2,2,6,6-tetramethyl-1-piperidinyloxy (TEMPO) and/or one or more its derivatives (ii). TEMPO and/or its derivatives may have the structure of formula (VI),

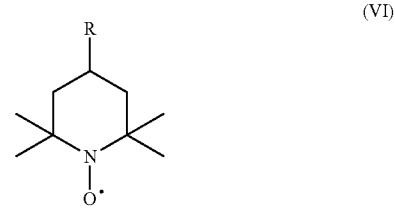

(VI)

wherein R is H, —OH, an alkyl, an alkoxy, or a (hetero) aryl.

R in formula (VI) can be H; —OH; a $C_1$-$C_{26}$, $C_1$-$C_{10}$, or $C_1$-$C_6$ alkyl, and preferably methyl, ethyl, or hexyl; a $C_1$-$C_{26}$, $C_1$-$C_{10}$, or $C_1$-$C_4$ alkoxy, and preferably methoxy, ethoxy, or butoxy; or a $C_5$-$C_{16}$, $C_5$-$C_{10}$, or $C_5$-$C_6$ (hetero) aryl, and preferably phenyl, naphthalenyl, pyridinyl, thiophenyl, or furanyl. More preferred R is H or —OH.

Suitable TEMPO and/or its derivatives may include, for example, 2,2,6,6-tetramethyl-1-piperidinyloxy (TEMPO), 4-hydroxy 2,2,6,6-tetramethyl-1-piperidinyloxy (4-hydroxy-TEMPO), 4-methyl 2,2,6,6-tetramethyl-1-piperidinyloxy (4-methyl-TEMPO), 4-ethyl 2,2,6,6-tetramethyl-1-piperidinyloxy (4-ethyl-TEMPO), 4-methoxy 2,2,6,6-tetramethyl-1-piperidinyloxy (4-methoxy-TEMPO), or mixtures thereof. Preferred TEMPO and/or derivatives thereof include TEMPO, 4-hydroxy 2,2,6,6-tetramethyl-1-piperidinyloxy (4-hydroxy-TEMPO), or mixtures thereof. The aqueous polymer dispersion of the present invention may comprise, based on the total dry weight of the aqueous polymer dispersion, 3.5% by weight or more, 4% by weight or more, 5% by weight or more, 6% by weight or more, or even 7% by weight or more, and at the same time, 50% by weight or less, 40% by weight or less, 30% by weight or less, 25% by weight or less, 20% by weight or less, or even 18% by weight or less, of TEMPO and/or its derivatives.

In one embodiment, the aqueous polymer dispersion is an aqueous dispersant useful for dispersing and stabilizing pigments and/or extenders in coating compositions. The aqueous polymer dispersion of the present invention can provide coatings with higher gloss retention than an aqueous polymer dispersion that does not comprise the above-described emulsion polymer, TEMPO, or a derivative of TEMPO. The aqueous polymer dispersion may have a solids content of from 10% to 45% by weight or from 25% to 40% by weight.

The obtained aqueous polymer dispersion may have a pH value of from 0.5 to 5.0, from 1.0 to 4.5, or from 1.5 to 4.0. The aqueous polymer useful in the present invention may have a viscosity of from 0 to 100 centipoises (cP), from 0 to 80 cP, or from 0 to 60 cP, as measured by 2 #spindle of Brookfield viscosity meter at 60 rpm. The aqueous polymer dispersion of the present invention may become water soluble upon neutralization. Neutralization can be conducted by adding one or more bases into the aqueous polymer dispersion. Examples of suitable bases include ammonia; alkali metal or alkaline earth metal compounds such as sodium hydroxide, potassium hydroxide, calcium hydroxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The present invention also relates to a process of preparing the aqueous polymer dispersion by (I) preparing the emulsion polymer in an aqueous medium by a free-radical polymerization of monomers described above in the presence of the surfactant and the chain transfer agent described above; and (II) mixing the emulsion polymer obtained from step (I) and from 3.5% to 50% by weight of TEMPO and/or its derivatives, based on the dry weight of the emulsion polymer. Conditions of preparation of the emulsion polymer are as described above. By "aqueous medium" herein is meant water and from 0 to 30%, by weight based on the weight of the medium, of water-miscible compound(s) such as, for example, alcohols, glycols, glycol ethers, glycol esters, and the like.

The present invention also relates an aqueous coating composition, preferably a paint formulation, comprising the aqueous polymer dispersion described above. When used in the aqueous coating composition, the aqueous polymer dispersion is typically neutralized to a high pH value, for example, 8 or higher, or even 8.5 or higher. The aqueous coating composition may comprise, by dry weight based on the total dry weight of the aqueous coating composition, from 0.05% to 10%, from 0.3% to 5%, or from 0.5% to 2%, of the aqueous polymer dispersion.

The aqueous coating composition of the present invention may further comprise one or more binders. The binder can be an acrylic emulsion polymer (for example, pure acrylic emulsion polymer, styrene acrylic emulsion polymer, or mixtures thereof), vinyl acetate-ethylene emulsion polymer, vinyl acetate emulsion polymer, or mixtures thereof. In one embodiment, the binder used is an acrylic emulsion polymer. "Acrylic emulsion polymer" herein refers to an emulsion polymer comprising, as polymerized units, one or more acrylic monomers or their mixtures with other monomers including, for example, styrene or substituted styrene. The binders may have a weight average molecular weight of 50,000 daltons or more, for example, from 50,000 to 1,000,000 daltons or from 100,000 to 200,000 daltons. The aqueous coating composition of the present invention may comprise, by dry weight based on the total dry weight of the aqueous coating composition, from 3% to 75%, from 10% to 60%, or from 20% to 50%, of the binder.

The aqueous coating composition of the present invention may further comprise pigments to form pigmented coating compositions (also known as "paint formulations"). "Pigment" herein refers to a particulate inorganic material which is capable of materially contributing to the opacity or hiding capability of a coating. Such materials typically have a refractive index greater than 1.8. Inorganic pigments may include, for example, titanium dioxide ($TiO_2$), zinc oxide, iron oxide, zinc sulfide, barium sulfate, barium carbonate, or mixture thereof. In a preferred embodiment, pigment used in the present invention is $TiO_2$. $TiO_2$ typically exists in two crystal forms, anastase and rutile. $TiO_2$ may be also available in concentrated dispersion form. The aqueous coating composition may also comprise one or more extenders. "Extender" herein refers to a particulate inorganic material having a refractive index of less than or equal to 1.8 and greater than 1.3. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 5% to 90%, from 10% to 85%, or from 15% to 80%. PVC may be determined according to the following equation:

$$PVC\% = [Volume_{(Pigment+Extender)} / Volume_{(Pigment+Extender+Binder)}] \times 100\%$$

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The concentration of the defoamer may be, based on the total dry weight of the aqueous coating composition, generally from 0 to 2% by weight, from 0.02% to 0.5% by weight, or from 0.04% to 0.2% by weight.

The aqueous coating composition of the present invention may further comprise one or more thickeners. The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is a hydrophobically-modified hydroxy ethyl cellulose (HMHEC). The concentration of the thickener may be, based on the total dry weight of the aqueous coating composition, generally from 0 to 10% by weight, from 0.1% to 4% by weight, or from 0.5% to 2% by weight.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. The concentration of the wetting agent may be, based on the total dry weight of the aqueous coating composition, from 0 to 5% by weight, 0.01% to 2% by weight, or from 0.2% to 1% by weight.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The concentration of the coalescent may be, based on the total dry weight of the aqueous coating composition, from 0 to 10% by weight, from 0.01% to 9% by weight, or from 1% to 8% by weight.

In addition to the components described above, the aqueous coating composition of the present invention may further comprise any one or combination of the following additives: buffers, neutralizers, humectants, mildewcides, biocides, anti-skinning agents, colorants, flowing agents, anti-oxidants, plasticizers, leveling agents, thixotropic agents, adhesion promoters, and grind vehicles. When present, these additives may be present in a combined amount of from 0 to 10% by weight, from 0.01% to 2% by weight, or from 0.05% to 1% by weight, based on the total weight of the aqueous coating composition.

The aqueous coating composition of the present invention may be prepared by admixing the aqueous polymer dispersion, the binder and other optional components, e.g., pigments and/or extenders as described above.

Components in the aqueous coating composition may be mixed in any order to provide the aqueous coating composition of the present invention. Any of the above-mentioned optional components may also be added to the composition during or prior to the mixing to form the aqueous coating composition. When the aqueous coating composition comprises pigment and/or extender, that is, a pigment formulation, the pigments and/or extenders are preferably mixed with the aqueous polymer dispersion as a dispersant to form a slurry of pigments and/or extender. The obtained admixture may be then subjected to shearing in a grinding or milling device as is well known in the pigment dispersion art. Such grinding or milling devices include roller mills, ball mills, bead mills, attrittor mills and include mills in which the admixture is continuously recirculated. The shearing of the admixture is continued for a time sufficient to disperse the pigment. The time sufficient to disperse the pigment is typically dependent on the nature of the pigment and the aqueous polymer dispersion as a dispersant and the grinding or milling device which is used and will be determined by the skilled practitioner. The solids content of the aqueous coating composition may be from 10% to 60% or from 25% to 40% by volume.

The aqueous coating composition of the present invention provides coatings made therefrom with improved durability. "Improved durability" herein refers to higher gloss retention after 1650 hours QUV test as measured according to the test method described in the Examples section below, for example, the aqueous coating composition of the present invention provides coatings with 60° gloss retention after 1650 hours QUV test, at least 2% higher, at least 3% higher, at least 5% higher, at least 7% higher, or even at least 9% higher, than incumbent aqueous coating compositions that do not comprise the above-described emulsion polymer, TEMPO, or a derivative of TEMPO. Surprisingly, when the aqueous coating composition comprises TEMPO and/or its derivatives, and the emulsion polymer that comprises, as polymerized units, the substituted styrene and the benzophenone derivative, the coatings obtained therefrom demonstrate 60° gloss retention after 1650 hours QUV test of at least 5% higher, at least 7% higher, or even at least 9% higher, than the incumbent aqueous coating compositions.

The present invention also relates to a process of using the aqueous coating composition of the present invention may comprise the following: applying the aqueous coating composition to a substrate, and drying, or allowing to dry, the applied aqueous coating composition.

The present invention also provides a method of preparing a coating. The method may comprise: forming the aqueous coating composition of the present invention, applying the aqueous coating composition to a substrate, and drying, or allowing to dry, the applied aqueous coating composition to form the coating.

The present invention also relates to a method of improving durability of a coating. The method may comprise (i) providing the aqueous coating composition of the present invention, (ii) applying the aqueous coating composition to a substrate; and (iii) drying, or allowing to dry, the aqueous coating composition to obtain the coating, wherein the coating has an improved efflorescence resistance as defined above.

The aqueous coating composition of the present invention can be applied to, and adhered to, various substrates. Examples of suitable substrates include wood, metals, plastics, foams, stones, elastomeric substrates, glass, fabrics, concrete, or cementitious substrates. The coating composition, preferably comprising the pigment, is suitable for various applications such as marine and protective coatings, automotive coatings, traffic paint, Exterior Insulation and Finish Systems (EIFS), roof mastic, wood coatings, coil coatings, plastic coatings, powder coatings, can coatings, architectural coatings, and civil engineering coatings. The coating composition is particularly suitable for architectural coatings.

The aqueous coating composition of the present invention can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition of the present invention has been applied to a substrate, the coating composition can dry, or allow to dry, to form a film (this is, coating) at room temperature (20-25° C.), or at an elevated temperature, for example, from 35° C. to 60° C.

EXAMPLES

Some embodiments of the invention will now be described in the following Examples, wherein all parts and percentages are by weight unless otherwise specified.

Materials used for making emulsion polymers are given as follows,

4-Hydroxy 2,2,6,6-tetramethyl-1-piperidinyloxy (4-hydroxy-TEMPO) is available from Sinopharm Chemical Reagent Co., Ltd.

A benzophenone derivative ("VBP") has the structure of

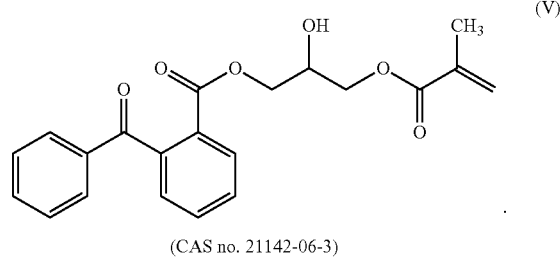 [SMILES: C=C(C)C(=O)OCC(O)COC(=O)c1ccccc1C(=O)c1ccccc1]

(CAS no. 21142-06-3)

Butyl acrylate ("BA") is available from Sinopharm Chemical Reagent Co., Ltd.

Methacrylic acid ("MAA") is available from Evonik Industry.

Butyl methacrylate ("BMA") is available from Sinopharm Chemical Reagent Co., Ltd.

Methyl 3-mercaptopropionate ("MMP") is available from TCI Company.

DISPONIL FES 993 surfactant, available from BASF, is a fatty polyglycol ether sulphate, sodium salt.

Ferrous sulfate heptahydrate ($FeSO_4 \cdot 7H_2O$) is available from Sinopharm Chemical Reagent Co., Ltd.

Vinyl toluene ("VT"), sodium persulfate ("SPS"), tert-Butyl hydroperoxide ("t-BHP"), and isoascorbic acid ("IAA") are all available from The Dow Chemical Company.

KATHON™ LX 1.5% microbiocide, available from The Dow Chemical Company, is a methyl and cloroisothiazolinone (KATHON is a trademark of The Dow Chemical Company).

The following standard analytical equipment and methods are used in the Examples.

Accelerated Durability Test

Gloss retention (%) was used as an indicator of coatings' durability. A coating composition was coated on an aluminum panel and allowed to dry for seven days in a constant temperature room (CTR, 25° C., 50% relative humidity ("RH")). Initial gloss values of the resultant coatings were then measured by a micro-TRI-gloss Gloss Meter (BYK-Gardner). The coated panel with about 30 m dry film thickness was then put into a QUV equipment (QUV/Se QUV Accelerated Weathering Tester from Q-Lab Corporation, 340 nm light source UVA, and 0.77 w/m² irradiance intensity) for accelerated durability tests. One cycle consisted of 4-hour UV irradiation at 60° C. followed by 4-hour water spray at 50° C. After multiple cycles in the QUV equipment for 1650 hours, the coated panel was taken out and cooled to room temperature (23° C.±2° C.). Gloss values of the coatings after QUV test were measured. Gloss retention (%) of the coatings before and after the accelerated durability test was calculated by Gloss retention %=(gloss(after QUV test)/gloss(before QUV test))×100%.

A higher gloss retention indicates better coating durability.

GPC Analysis

The molecular weight of an emulsion polymer sample was measured by GPC analysis using an Agilent 1200. The sample was dissolved in tetrahydrofuran (THF)/formic acid (FA) (5%) with a concentration of 2 mg/mL and then filtered through 0.45 μm polytetrafluoroethylene (PTFE) filter prior to the GPC analysis. The GPC analysis was conducted using the following conditions:

Column: One PLgel GUARD columns (10 μm, 50×7.5 mm), One Mixed B columns (7.8×300 mm) in tandem, column temperature: 40° C.; mobile phase: THF/FA (5%); flow rate: 1.0 mL/minute; Injection volume: 100 μL; detector: Agilent Refractive Index detector, 40° C.; and calibration curve: PL Polystyrene Narrow standards with molecular weights ranging from 2329000 to 580 g/mol, using polynom 3 fitness.

Dispersant A

A five-liter, five-necked flask equipped with a mechanical stirrer, N2 sweep, a thermocouple, and a condenser was charged with 750 grams (g) of water and 3.90 g of DISPONIL FES 993 surfactant. The solution in the flask was heated to 86° C. An initiator, 1.30 g of sodium persulfate (SPS) dissolved in 15 g of water, was added. Two minutes later, a monomer emulsion comprising 390.00 g of BMA, 210.00 g of MAA, 15.30 g of MMP, and 36.60 g of DISPONIL FES 993 surfactant in 350 g of water was fed. Simultaneously, an initiator solution including 1.05 g of SPS and 90 g of water was co-fed over a period of 90 minutes while the reactant temperature was maintained around 86° C., and held for 5 minutes after the end of the feeds. After cooling to 60° C., a chaser system including 4 g of ferrous sulfate solution (0.2%, aqueous) and 1.18 g of t-BHP in 10 g of water, as well as 0.58 g of IAA in 10 g of water were added. After holding for 15 minutes, the identical chaser system was charged again. The batch was cooled down to 40° C., and a biocide solution (7.41 g of KATHON LX 1.5% in 28 g of water) was added over 10 minutes. Finally, the resultant emulsion was cooled to ambient temperature and filtered through 325 mesh size screen to afford a polymer emulsion with total solids of 30% by weight and pH around 3.2, wherein the polymer (65BMA/35MAA, % by weight based on total monomer weight) had an average particle size of 185.9 nm and a weight average molecular weight of 10,496 daltons.

Dispersant A1

Dispersant A1 was prepared by adding 37.00 g of 20% aqueous solution of 4-hydroxy-TEMPO into 308.67 g of the above prepared Dispersant A.

Dispersant B

Dispersant B was prepared according to the same procedure as preparing Dispersant A, except that the monomer emulsion used in preparing Dispersant B comprised 294.00 g of BMA, 36.00 g of BA, 60.00 g of VBP, 210.00 g of MAA, 15.30 g of MMP, and 36.60 g of DISPONIL FES 993 surfactant in 350 g of water. The resultant polymer emulsion had total solids of 30% by weight and pH around 3.2, wherein the polymer (49BMA/6BA/10VBP/35MAA, % by weight based on total monomer weight) had an average particle size of 185.9 nm and a weight average molecular weight of 10,496 daltons.

Dispersant B1

Dispersant B1 was prepared by adding 37.00 g of 20% aqueous solution of 4-hydroxy-TEMPO into 308.67 g of the above prepared Dispersant B.

Dispersant C

Dispersant C was prepared according to the same procedure as preparing Dispersant A, except that the monomer emulsion used in preparing Dispersant C comprised 60.00 g of VT, 330.00 g of BMA, 210.00 g of MAA, 15.30 g of MMP, and 36.60 g of DISPONIL FES 993 surfactant in 350 g of water. The resultant polymer emulsion had total solids of 30% by weight and pH around 3.2, wherein the polymer (55BMA/10VT/35MAA, % by weight based on total monomer weight) had an average particle size of 114.1 nm and a weight average molecular weight of 8,787 daltons.

Dispersant C1

Dispersant C1 was prepared by adding 37.00 g of 20% aqueous solution of 4-hydroxy-TEMPO into 308.67 g of the above prepared Dispersant C.

Dispersant D

Dispersant D was prepared according to the same procedure as preparing Dispersant A, except that the monomer emulsion used in preparing Dispersant D comprised 234.00 g of BMA, 36.00 g of BA, 60.00 g of VT, 60.00 g of VBP, 210.00 g of MAA, 15.30 g of MMP, and 36.60 g of DISPONIL FES 993 surfactant in 350 g of water. The resultant polymer emulsion had total solids of 30% by weight and pH around 3.2, wherein the polymer (39BMA/6BA/10VT/10VBP/35MAA, % by weight based on total monomer weight) had an average particle size of 143.3 nm and a weight average molecular weight of 9,498 daltons.

Dispersant D1

Dispersant D1 was prepared by adding 37.00 g of 20% aqueous solution of 4-hydroxy-TEMPO into 308.67 g of the above prepared Dispersant D.

Dispersant D2

Dispersant D2 was prepared by adding 14.50 g of 20% aqueous solution of 4-hydroxy-TEMPO into 323.67 g of the above prepared Dispersant D.

Dispersant D3

Dispersant D3 was prepared by adding 90.00 g of 20% aqueous solution of 4-hydroxy-TEMPO into 273.33 g of the above prepared Dispersant D.

Dispersant D4 Dispersant D4 was prepared by adding 185.00 g of 20% aqueous solution of 4-hydroxy-TEMPO into 210.00 g of the above prepared Dispersant D.

Dispersant E

Dispersant E was prepared according to the same procedure as preparing Dispersant A, except that the monomer emulsion used in preparing Dispersant E comprised 174.00 g of BMA, 36.00 g of BA, 120.00 g of VT, 60.00 g of VBP, 210.00 g of MAA, 15.30 g of MMP, and 36.60 g of DISPONIL FES 993 surfactant in 350 g of water. The resultant polymer emulsion had total solids of 30% by weight and pH around 3.2, wherein the polymer (29BMA/6BA/20VT/10VBP/35MAA, % by weight based on total monomer weight) had a particle size of 122.4 nm and a weight average molecular weight of 10,591 daltons.

Dispersant E1

Dispersant E1 was prepared by adding 37.00 g of 20% aqueous solution of 4-hydroxy-TEMPO into 308.67 g of the above prepared Dispersant E.

Paint Formulations

Paint formulations of Examples (Exs) 1-6 and Comparative (Comp) Exs 1-7 were prepared based on formulations given in Table 1. Firstly, water, propylene glycol, the above obtained dispersant, AMP-95 neutralizer, BD-109 surfactant, and BYK-024 defoamer were mixed, followed by adding TiO$_2$ (Ti-Pure R-706) and grinding under 1500 rpm agitation for about 30 minutes to form the grind. Then, letdown additives including ACRYSOL RM-2020 and ACRYSOL RM-8W thickeners, TEXANOL coalescent, ROCIMA 363 and KATHON LXE preservatives, and RHOPLEX AC-261 dispersion were added to the grind and further stirred for 30 minutes. The dispersant used in each paint formulation is given in Table 2.

The obtained paint formulations were used for gloss retention tests and results of gloss retention properties are given in Table 2.

TABLE 1

Paint Formulation

| Material Name | Supplier | Kilograms |
| --- | --- | --- |
| Grind | | |
| Water | | 45.89 |
| Propylene Glycol | The Dow Chemical Company | 15.00 |
| Dispersant | Self-preparation | 11.5 |
| AMP-95 Base used as a neutralizing agent | The Dow Chemical Company | 0.88 |
| ECOSURF ™ BD-109 Surfactant ("BD-109") | The Dow Chemical Company | 1.60 |
| BYK-024 Defoamer | BYK | 1.00 |
| Ti-Pure R-706 Titanium Dioxide | Chemours | 240.00 |
| Grind Sub-total | | 318.77 |
| LetDown | | |
| RHOPLEX ™ AC-261 Acrylic Emulsion used as a binder | The Dow Chemical Company | 518.00 |
| Water | | 120.24 |
| ACRYSOL ™ RM-2020 NPR Nonionic Thickener | The Dow Chemical Company | 10.00 |
| TEXANOL Coalescent | Eastman Chemical Company | 18.00 |
| ACRYSOL RM-8W Nonionic Thickener | The Dow Chemical Company | 3.20 |
| Water | | 14.69 |
| KATHON ™ LXE Preservative | The Dow Chemical Company | 1.00 |
| ROCIMA ™ 363 Preservative | The Dow Chemical Company | 5.00 |
| Total | | 1009 |

*Total PVC of paint formulations: 21%
** ECOSURF, RHOPLEX, ACRYSOL, KATHON, and ROCIMA are all trademarks of The Dow Chemical Company.

As shown in Table 2, Dispersant A comprised an emulsion polymer containing no polymerized units of VT or VBP. Addition of 4-hydroxy-TEMPO into the paint of Comp Ex 1 comprising Dispersant A negatively influenced the gloss retention of the obtained paint of Comp Ex 2.

Dispersant B1 comprising 4-hydroxy-TEMPO and an emulsion polymer comprising polymerized units of VBP provided the paint of Ex 1 with higher gloss retention than Dispersant B that didn't comprise 4-hydroxy-TEMPO (Comp Ex 3). As compared to Dispersant C, Dispersant C$_1$ combing 4-hydroxy-TEMPO and an emulsion polymer comprising polymerized units of VT provided the paint of Ex 2 with higher gloss retention.

In addition to the same emulsion polymer as Dispersant E, Dispersant E1 further comprising 7.4% by weight of 4-hydroxy-TEMPO provided the paint of Ex 4 with surprisingly higher gloss retention (about 7% increase of gloss retention) than the paint of Comp Ex 5.

Dispersants D1, D3 and D4, which all comprised a specific amount of 4-hydroxy-TEMPO and an emulsion polymer comprising polymerized units of VT and VBP, surprisingly provided paints of Ex 3, Ex 5 and Ex 6, respectively, with gloss retention by at least 10% higher than the paint without 4-hydroxy-TEMPO (Comp Ex 6), or the paint comprising 2.9% by weight of 4-hydroxy-TEMPO based on the total dry weight of Dispersant D2 (Comp Ex 7).

TABLE 2

| Paint Formulation | Dispersant Type | VT level*, % | VBP level*, % | 4-hydroxy-TEMPO level**, % | 60° C. gloss retention (1650 hours), % |
|---|---|---|---|---|---|
| Comp Ex 1 | Dispersant A | 0 | 0 | 0 | 58.6 |
| Comp Ex 2 | Dispersant A1 | 0 | 0 | 7.4 | 54.9 |
| Comp Ex 3 | Dispersant B | 0 | 10 | 0 | 59.2 |
| Ex 1 | Dispersant B1 | 0 | 10 | 7.4 | 62.5 |
| Comp Ex 4 | Dispersant C | 10 | 0 | 0 | 62 |
| Ex 2 | Dispersant C1 | 10 | 0 | 7.4 | 64.1 |
| Comp Ex 5 | Dispersant E | 20 | 10 | 0 | 68.3 |
| Ex 4 | Dispersant E1 | 20 | 10 | 7.4 | 75.8 |
| Comp Ex 6 | Dispersant D | 10 | 10 | 0 | 63.5 |
| Ex 3 | Dispersant D1 | 10 | 10 | 7.4 | 73.2 |
| Comp Ex 7 | Dispersant D2 | 10 | 10 | 2.9 | 61.5 |
| Ex 5 | Dispersant D3 | 10 | 10 | 18 | 75.8 |
| Ex 6 | Dispersant D4 | 10 | 10 | 37 | 75.6 |

*VT and VBP levels refer to the weight percentage of VT and VBP, respectively, based on the dry weight of the emulsion polymer in a dispersant.
**4-hydroxy-TEMPO level refers to the weight percentage of TEMPO, based on the total dry weight of the dispersant (i.e., the total dry weight of the emulsion polymer and 4-hydroxy-TEMPO in the dispersant).

What is claimed is:

1. An aqueous polymer dispersion, comprising:

(i) an emulsion polymer having a weight average molecular weight of from 2,000 to 30,000 daltons, wherein the emulsion polymer comprises as polymerized units, based on the dry weight of the emulsion polymer, (a) from 10% to 90% by weight of an ethylenically unsaturated ionic monomer, (b) from 5% to 90% by weight of a photosensitive monomer, and (c) from 0 to 85% by weight of an ethylenically unsaturated nonionic monomer; and (ii) from 3.5% to 50% by weight of TEMPO and/or a derivative thereof, based on the total dry weight of the aqueous polymer dispersion wherein the photosensitive monomer comprises a substituted styrene and, a benzophenone derivative;

wherein the substituted styrene has the structure of formula (I),

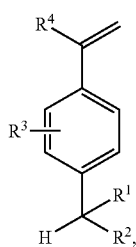

wherein $R^1$, $R^2$, and $R^3$ are each independently selected from the group consisting of H, an alkyl, an alkoxy, and a (hetero)aryl; and $R^4$ is H or an alkyl; and wherein the benzophenone derivative has the structure of formula (II), (III), or (IV),

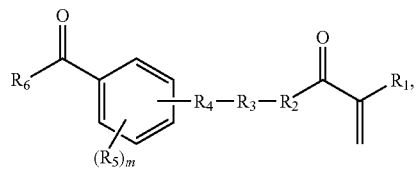

wherein, in formula (II):

$R^1$ is H or methyl;

$R^2$ is —O— or —NH—;

$R^3$ has the following structure Z,

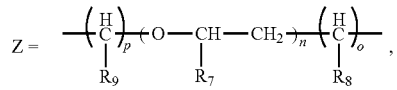

wherein $R_7$, $R_8$, and $R_9$ are each independently H or methyl, n is an integer of from 0 to 200, and o and p are each independently an integer of from 0 to 2;

$R_4$ is —O—, —NH—, —O—CO—O—, —CO—, —NH—CO—O—, —NH—CO—NH—, or —S—;

$R_5$ is H, a halogen, or a $C_1$-$C_{20}$ moiety optionally substituted by oxygen, nitrogen, sulphur, or combinations thereof;

m is an integer of from one to 4; and $R_6$ is aryl;

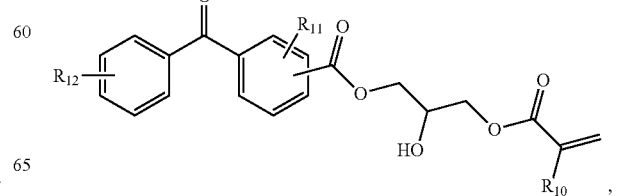

-continued

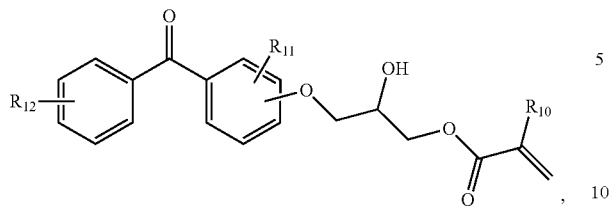
(IV)

wherein, in formula (III) and/or (IV), $R_{10}$ is H or methyl; and $R_{11}$ and $R_{12}$ are each independently selected from the group consisting of H, an alkyl, an alkoxy, and a (hetero)aryl; and wherein the emulsion polymer comprises as polymerized units, based on the dry weight of the emulsion polymer, from 5% to 50% by weight of the substituted styrene and from 5% to 40% by weight of the benzophenone derivative.

2. The aqueous polymer dispersion of claim 1 wherein the substituted styrene is selected from the group consisting of vinyl toluene, 1-methyl-4-(prop-1-en-2-yl)benzene, 2,4-dimethyl-1-vinylbenzene, and 1,2-dimethyl-4-vinylbenzene.

3. The aqueous polymer dispersion of claim 1, wherein the emulsion polymer has an average particle size of from 50 nm to 500 nm.

4. The aqueous polymer dispersion of claim 1, wherein the aqueous polymer dispersion comprises, based on the total dry weight of the aqueous polymer dispersion, from 5% to 20% by weight of TEMPO and/or a derivative thereof.

5. The aqueous polymer dispersion of claim 1, wherein TEMPO and/or its derivative are selected from the group consisting of TEMPO, 4-hydroxy-TEMPO, 4-methyl-TEMPO, 4-methoxy-TEMPO, and 4-ethyl-TEMPO.

6. The aqueous polymer dispersion of claim 1, wherein the emulsion polymer comprises as polymerized units, based on the dry weight of the emulsion polymer,
from 20% to 70% by weight of the ethylenically unsaturated ionic monomer,
from 10% to 50% by weight of vinyl toluene,
from 5% to 30% by weight of the benzophenone derivative, and
from 15% to 65% by weight of the ethylenically unsaturated nonionic monomer.

7. A process of preparing the aqueous polymer dispersion of claim 1, comprising:
(I) preparing an emulsion polymer in an aqueous medium by polymerization of monomers in the presence of a surfactant and a chain transfer agent, such that the emulsion polymer comprises as polymerized units, based on the dry weight of the emulsion polymer,
(a) from 10% to 90% by weight of an ethylenically unsaturated ionic monomer,
(b) from 5% to 90% by weight of a photosensitive monomer, and
(c) from 0 to 85% by weight of an ethylenically unsaturated nonionic monomer; and
(II) mixing the emulsion polymer obtained from step (I) and from 3.5% to 50% by weight of TEMPO and/or a derivative thereof, based on the total dry weight of the aqueous polymer dispersion, to obtain the aqueous polymer dispersion;
wherein the photosensitive monomer comprises a substituted styrene and a benzophenone derivative;

wherein the substituted styrene has the structure of formula (I),

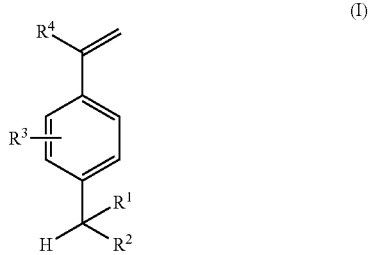
(I)

wherein $R^1$, $R^2$, and $R^3$ are each independently selected from the group consisting of H, an alkyl, an alkoxy, and a (hetero)aryl; and R* is H or an alkyl; and wherein the benzophenone derivative has the structure of formula (II), (III),

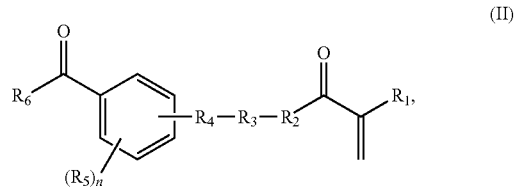
(II)

or (IV),
wherein, in formula (II):
$R^1$ is H or methyl;
$R^2$ is —O— or —NH—;
$R^3$ has the following structure Z,

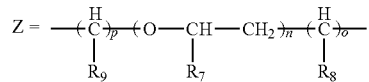

wherein $R_7$, $R_8$, and $R_9$ are each independently H or methyl, n is an integer of from 0 to 200, and o and p are each independently an integer of from 0 to 2;
$R_4$ is —O—, —NH—, —O—CO—O—, —CO—, —NH—CO—O—, —NH—CO—NH—, or —S—;
$R_5$ is H, a halogen, or a $C_1$-$C_{20}$ moiety optionally substituted by oxygen, nitrogen, sulphur, or combinations thereof;
m is an integer of from one to 4; and
$R_6$ is aryl;

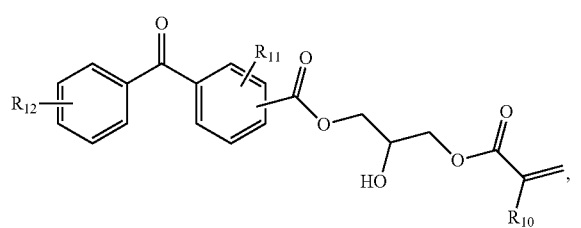
(III)

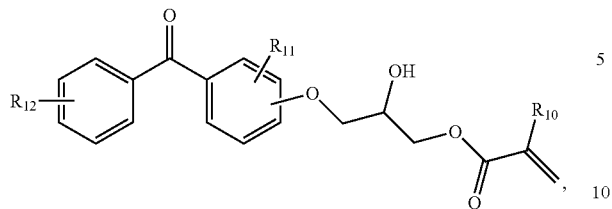

wherein, in formula (III) and/or (IV), $R_{10}$ is H or methyl; and $R_{11}$ and $R_{12}$ are each independently selected from the group consisting of H, an alkyl, an alkoxy, and a (hetero)aryl; and wherein the emulsion polymer comprises as polymerized units, based on the dry weight of the emulsion polymer, from 5% to 50% by weight of the substituted styrene and from 5% to 40% by weight of the benzophenone derivative;

wherein the emulsion polymer having a weight average molecular weight of from 2,000 to 30,000 daltons.

8. An aqueous coating composition, comprising: the aqueous polymer dispersion of claim 1, and a binder.

9. The aqueous coating composition of claim 8 further comprising a pigment.

\* \* \* \* \*